United States Patent
Strak et al.

(10) Patent No.: US 10,480,989 B2
(45) Date of Patent: Nov. 19, 2019

(54) DEVICE FOR CREATING A LOAD PROFILE OF A VEHICLE

(71) Applicant: ZF Friedrichshafen AG, Friedrichshafen (DE)

(72) Inventors: Dieter Strak, Immenstaad am Bodensee (DE); Anton Waibel, Friedrichshafen (DE); Ömer Mumcu, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 148 days.

(21) Appl. No.: 15/656,621

(22) Filed: Jul. 21, 2017

(65) Prior Publication Data
US 2018/0023998 A1 Jan. 25, 2018

(30) Foreign Application Priority Data
Jul. 22, 2016 (DE) .................. 10 2016 213 497

(51) Int. Cl.
  *B60R 16/023* (2006.01)
  *G01G 19/08* (2006.01)
  *G01G 9/00* (2006.01)
  *G01G 19/03* (2006.01)
(52) U.S. Cl.
  CPC ........ *G01G 19/086* (2013.01); *B60R 16/0232* (2013.01); *B60R 16/0234* (2013.01); *G01G 9/00* (2013.01); *G01G 19/035* (2013.01)

(58) Field of Classification Search
  CPC .......... G01G 9/00; G01G 19/08–19/19; G01G 23/005; B60R 16/0232; B60R 16/0234
  See application file for complete search history.

(56) References Cited

U.S. PATENT DOCUMENTS

| | | | | |
|---|---|---|---|---|
| 1,809,373 A | * | 6/1931 | Bonnette | B60Q 1/52 116/283 |
| 3,531,766 A | * | 9/1970 | Leo | B60R 16/0232 177/136 |
| 4,048,848 A | * | 9/1977 | Dybel | B30B 15/0094 73/764 |
| 4,839,835 A | * | 6/1989 | Hagenbuch | G08G 1/20 702/174 |
| 5,215,154 A | * | 6/1993 | Kirby | G01G 19/03 177/136 |
| 6,263,039 B1 | * | 7/2001 | Ducharme | G01G 19/08 377/15 |

(Continued)

FOREIGN PATENT DOCUMENTS

| | | |
|---|---|---|
| DE | 10 2009 002 387 A1 | 10/2010 |
| DE | 10 2013 220 604 A1 | 4/2015 |

(Continued)

*Primary Examiner* — Randy W Gibson
(74) *Attorney, Agent, or Firm* — Brinks Gilson & Lione

(57) ABSTRACT

One general aspect of the present disclosure includes a control device for use in a vehicle. The control device may include a first counter and a second counter, where the first counter is assigned to a first weight range and the second counter is assigned to a second weight range. The control device may be configured to execute the following steps in an iterative manner: determination of an overall weight of the vehicle, and incrimination of the first counter when the overall weight falls within the first range.

16 Claims, 1 Drawing Sheet

(56) References Cited

U.S. PATENT DOCUMENTS

| | | | |
|---|---|---|---|
| 6,721,680 B2* | 4/2004 | Sorrells | G01G 19/08 477/120 |
| 6,839,615 B2* | 1/2005 | Yanase | B60T 8/172 701/1 |
| 7,970,523 B2* | 6/2011 | Wallis | G01M 13/025 123/406.23 |
| 2005/0034902 A1* | 2/2005 | Madhavarao | G01G 19/08 177/136 |
| 2009/0095539 A1* | 4/2009 | Pfohl | E02F 9/26 177/139 |
| 2012/0259536 A1 | 10/2012 | Klier | |
| 2015/0316921 A1* | 11/2015 | Atherton | G05B 19/4065 700/114 |
| 2017/0370764 A1* | 12/2017 | Xu | G01G 19/02 |

FOREIGN PATENT DOCUMENTS

| | | |
|---|---|---|
| EP | 2 933 614 A1 | 10/2015 |
| WO | WO 2014/126523 A1 | 8/2014 |

\* cited by examiner

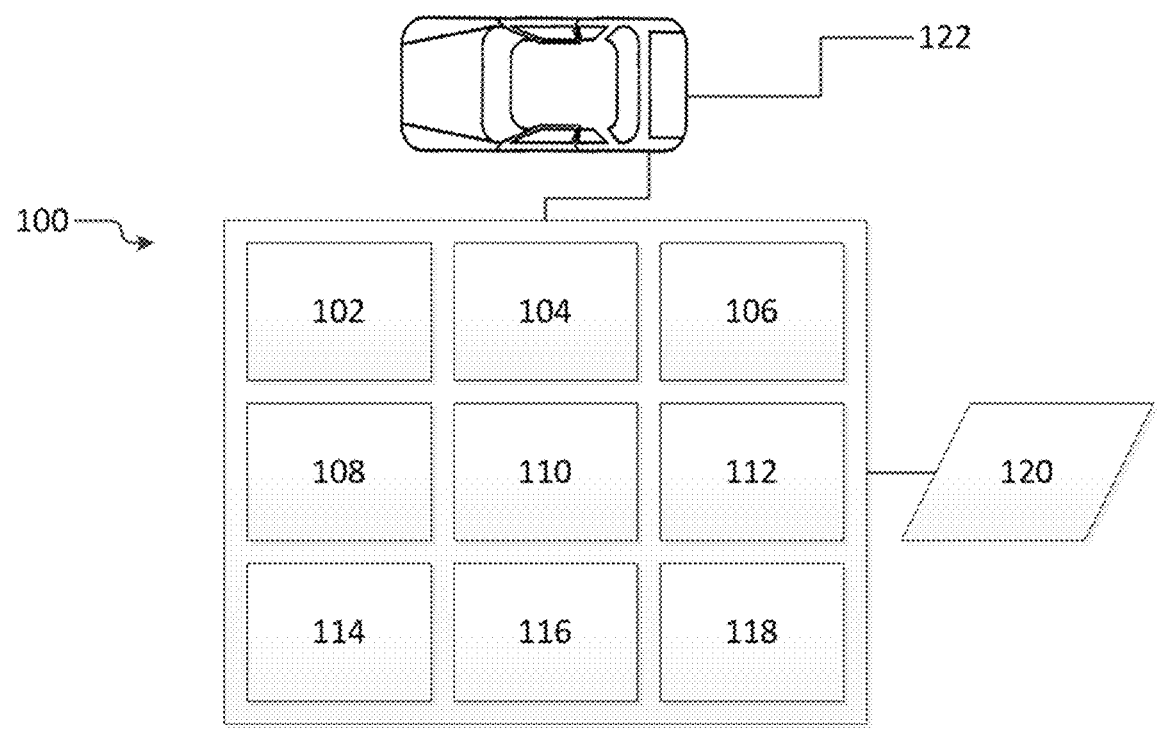

DEVICE FOR CREATING A LOAD PROFILE OF A VEHICLE

RELATED APPLICATIONS

This application claims the benefit and priority of German Patent Application DE 10 2016 213 497.3, filed Jul. 22, 2016, which is incorporated by reference herein in its entirety.

TECHNICAL FIELD

The present disclosure relates to a control device use in a vehicle and a method for determining a load history of a vehicle.

BACKGROUND

If the transmission of a vehicle becomes damaged, it is normally not possible to verify the load with which the vehicle was operated. In particular, a possible overloading of the vehicle cannot be verified. Such information may be necessary in assessing possibly existing guarantee claims. Guarantee claims are normally linked to compliance with a maximum acceptable load. If a vehicle is overloaded, the guarantee claims are typically voided.

A further problem associated with the loading of a vehicle includes difficulty related to the predictability of the remaining lifetime of the transmission. This predictability is correlated with the load with which the vehicle has been operated in the past.

Certain prior art references teach defining various transmissions settings based on the weight of a vehicle and detecting a change from one weight range to the next. It is further known to calculate and plot the masses of a vehicle over time. For example, EP 2 933 614 A1 discloses a method for determining a change in the current weight on the basis of a rolling resistance and a mass history of a vehicle. DE 10 2013 220 604 A1 teaches to store the current and load-dependent vehicle mass in a telematic detection system in a vehicle. One or more input and output devices can be connected to the detection system, with which data can be read out. It is specified in DE 10 2009 002 387 A1 that the vehicle mass can be calculated by way of a transmission control device of a vehicle on the basis of topographical data. WO 2014/126523 A1 contains a method for calculating and plotting the mass of a vehicle over time. From US 2012/259536 A2 it is known to determine, continuously or in intervals, the overall mass of a vehicle at the start.

However, the prior art does not teach certain aspects of this disclosure, including that a vehicle mass can be recorded as a function of time over the lifetime of a transmission. Instructions for detecting individual weight ranges in which the vehicle has been operated as a function of time also cannot be found in the prior art.

BRIEF SUMMARY

One general aspect of the present disclosure includes a control device for use in a vehicle. The control device may include a first counter and a second counter, where the first counter is assigned to a first weight range and the second counter is assigned to a second weight range. The control device may be configured to execute the following steps in an iterative manner: determination of an overall weight of the vehicle, and incrimination of the first counter when the overall weight falls within the first range.

Another general aspect of the present disclosure includes a method. The method may include determining an overall weight of a vehicle with a control device, where the control device has a first counter and a second counter. The method may further include incrementing one of the first counter and the second counter when the overall weight falls respectively within a first range or a second range.

BRIEF DESCRIPTION OF THE DRAWINGS

FIG. 1 shows a control system in accordance with an aspect of the present disclosure.

DETAILED DESCRIPTION

The present disclosure addresses the object of eliminating intrinsic shortcomings and disadvantages of the solutions known from the prior art. In particular, guarantee claims should be able to be assessed with respect to a possible overloading of a vehicle. Based on this, there is the further object of being able to retrace the load states with which the vehicle has been operated over the course of its lifetime.

In one aspect, a control device of the present disclosure may be a computing unit for controlling or regulating a technological system. The control device may be designed for use in a vehicle, in particular a motor vehicle, such as a passenger car or a utility motor vehicle. In particular, the control device may be a transmission control device.

The control device may implement a first counter and a second counter. Thus, the control device can provide a first storage space and a second storage space in which numerical values can be stored. The first storage space may form the first counter and the second storage space may form the second counter.

A counter may indicate a modifiable numerical value, in particular a numerical value that can be initialized, incremented and/or decremented. The numerical value may correspond to a natural number.

The first counter may be assigned to a first weight range and the second counter may be assigned to a second weight range. A weight range may be understood to be an interval of numerical values or the measured values of a weight. Weight is used here synonymously with mass. The interval may be a closed interval, an open interval, a semi-open interval or an absolute interval. The interval for the first counter and second counter is preferably a right open interval or a right-side infinite closed interval.

In accordance with the present disclosure, the control device may be configured to execute the following method steps in an iterative manner, i.e. repetitively:
  determination of an overall weight of the vehicle; and
  incrementing the first counter when the overall weight falls in the first range, i.e. when a numerical value of the overall weight is contained in the first range, or incrementing the second counter when the overall weight falls in the second range, i.e. when a numerical value of the overall weight is contained in the second range. Incrementing may mean increasing by 1.

The overall weight may indicate an empty weight of the vehicle together with the weight of its payload. The overall weight may be determined at the point in time when the above method steps are executed. A payload refers to objects and/or materials with which the vehicle is loaded.

The method steps may be repeated at least twice. Preferably, they are repeated until the iterative execution of the method steps is discontinued.

In some embodiments, the method steps may be be executed periodically, i.e. in an iterative and time-controlled manner. An iteration of the method steps may be triggered when a specific time interval has lapsed since the start of the preceding iteration. Thus, the periodic execution of the method steps can be initiated at any time.

A control device according the present disclosure may record, by way of the first counter and the second counter, the number of time intervals in which the overall weight of the vehicle lies within the respective ranges assigned to the counters.

An overloading may be verified when the first weight range or the second weight range corresponds to an unacceptable weight for the vehicle. Thus, the first weight range can correspond to an acceptable overall weight for the vehicle, and the second weight range can correspond to an overloaded vehicle. It is then possible to determine how long the vehicle has been acceptably loaded and how long the vehicle has been overloaded on the basis of the first counter and the second counter.

In some embodiments, the control device determines the overall weight on the basis of at least a torque present on a vehicle transmission shaft. Accordingly, a transmission control device is used as the control device.

The control device may determine the overall weight on the basis of at least an acceleration of the vehicle in a further preferred development. This is possible because there is a physical relationship between the overall weight, the acceleration and an accelerating force acting on the vehicle. The specified force can be determined, based on the torque at the transmission shaft.

The control device may have a non-volatile memory. The data stored in a non-volatile memory may also remain intact when an electrical voltage for supplying the memory with electrical energy is shut off. In order for the first counter and the second counter to remain intact after the vehicle has been shut off, i.e. after shutting off the supply voltage present in an internal power supply of the vehicle, the control device first stores the first counter and the second counter in the non-volatile memory.

In a method according to the present disclosure, the first counter and the second counter are initialized or set to 0. This means that the value 0 is stored in the first counter and the second counter. Subsequently, the following method steps may be executed in an iterative manner:

determination of the overall weight of the vehicle as described above; and incrementing the first counter when the overall weight falls in the first range, or incrementing the second counter when the overall weight falls in the second range, as described above.

After the iterative execution of the method steps is completed, the first counter and the second counter may be read out in a preferred further development. This serves to evaluate the values stored in the first counter and the second counter, as described above.

One non-limiting example is described in the following paragraphs. This example provides for nine weight ranges.

Non-Limiting Example

Referring to FIG. 1 a first weight range comprises the values 0 to 2,500 kg, a second weight range comprises the values from than 2,501 to 3,500 kg, a third weight range comprises the values from than 3,501 to 6,000 kg, a fourth weight range comprises the values from than 6,001 to 7,000 kg, a fifth weight range comprises the values from 7,001 to 9,000 kg, a sixth weight range comprises the values from 9,001 to 10,900 kg, a seventh weight range comprises the values from 10,901 to 11,500 kg, an eight weight range comprises the values from 11,501 to 13,000 kg, and a ninth weight range comprises all of the values greater than 13,000 kg.

Each of the weight ranges is assigned to a counter of a control system 100. The first weight range is assigned to a first counter 102, the second weight range to a second counter 104, the third weight range to a third counter 106, the fourth weight range to a fourth counter 108, the fifth weight range to a fifth counter 110, the sixth weight range to a sixth counter 112, the seventh weight range to a seventh counter 114, the eighth weight range to an eighth counter 116, and the ninth weight range to a ninth counter 118. These counters are initialized or set to 0.

The current weight of a vehicle 122 is periodically determined during operation of the vehicle 122. The counter to which the weight range containing the determined overall weight is assigned, is incremented, i.e. increased by 1. Prior to switching off the vehicle 122, the values of the nine counters are stored in a memory 120, such as a non-volatile memory (e.g., E2PROM).

A time factor, i.e. the dwell time of the vehicle in the individual weight ranges, can be determined on the basis of the values stored in the individual counters. When a threshold that can be calibrated has been exceeded, a corresponding entry is stored in the error memory of the vehicle, in order to inform a service technician of the exceeding of the acceptable load collectives.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A control device for use in a vehicle, comprising:
    a measurement device mechanically coupled to a vehicle transmission shaft and configured to measure a torque of the vehicle transmission shaft;
    a first counter and a second counter connected to the measurement device,
    wherein the first counter is assigned to a first weight range and the second counter is assigned to a second weight range,
    wherein the control device is configured to execute the following steps in an iterative manner:
    determination of an overall weight of the vehicle based on the torque; and
    incrimination of the first counter when the overall weight falls within the first range.

2. The control device of claim 1, wherein the control device is further configured to incrementing the second counter when the overall weight falls within the second range.

3. The control device according to claim 1, wherein the control device determines the overall weight on the basis of at least an acceleration of the vehicle.

4. The control device according to claim 1, further comprising at least one non-volatile memory, wherein the control device stores the first counter and the second counter in the memory when the vehicle is shut down.

5. The control device according to claim 1, further comprising a third counter, wherein the third counter is assigned to a third weight range, and wherein the control device is configured to increment the third counter when the overall weight of the vehicle falls within the third weight range.

6. The control device according to claim 5, wherein the first weight range and the second weight range do not overlap.

7. The control device according to claim 5, wherein the steps executed by the control device are executed in a time-controlled manner.

8. A vehicle having a control device according to claim 5.

9. A method comprising:
  determining an overall weight of a vehicle with a control device based on a torque in a transmission shaft of the vehicle, the control device having a first counter and a second counter; and
  incrementing one of the first counter and the second counter when the overall weight falls respectively within a first range or a second range,
  wherein a measurement device mechanically coupled to a vehicle transmission shaft measures the torque in the transmission shaft.

10. The method of claim 9, further comprising initializing the first counter and the second counter with zero.

11. The method of claim 9, wherein the steps are executed in an iterative manner.

12. The method of claim 9, further comprising reading out the first counter and the second counter with a detection system.

13. The method of claim 9, wherein the control device determines the overall weight on the basis of at least an acceleration of the vehicle.

14. The method of claim 9, wherein at least one non-volatile memory stores the first counter and the second counter when the vehicle is shut down.

15. The method of claim 9, wherein the control device further comprises a third counter, wherein the third counter is assigned to a third weight range, and wherein the control device is configured to increment the third counter when the overall weight of the vehicle falls within the third weight range.

16. The method of claim 15, wherein the control device further comprises a third counter, wherein the third counter is assigned to a third weight range, and wherein the control device is configured to increment the third counter when the overall weight of the vehicle falls within the third weight range.

* * * * *